A. W. SCHRAMM.
VALVE.
APPLICATION FILED NOV. 29, 1911.

1,054,457.

Patented Feb. 25, 1913.

Witnesses:—
Walter Thiem
Wills A. Burrows

Inventor:
Adolph W. Schramm
by his Attorneys:
Howson & Howson

UNITED STATES PATENT OFFICE.

ADOLPH W. SCHRAMM, OF RIVERTON, NEW JERSEY, ASSIGNOR TO ELECTRO DENTAL MANUFACTURING COMPANY, OF PHILADELPHIA, PENNSYLVANIA, A CORPORATION OF PENNSYLVANIA.

VALVE.

1,054,457.  Specification of Letters Patent.  Patented Feb. 25, 1913.

Application filed November 29, 1911. Serial No. 663,069.

*To all whom it may concern:*

Be it known that I, ADOLPH W. SCHRAMM, a citizen of the United States, residing in Riverton, Burlington county, New Jersey, have invented certain Improvements in Valves, of which the following is a specification.

One object of my invention is to provide a valve particularly adapted for use on dental switch boards, although it is available for other uses; the construction of said valve being substantial and permitting of its rapid and inexpensive manufacture and assembly, and its parts being so arranged as to not easily get out of order.

Another object of the invention is to provide a valve with a handle made in such a form as to give visual indication of whether said valve is open or shut and also capable of being set to indicate the direction of flow of fluid; there being a definite relation between the position of the valve stem and the handle thereon when the valve is seated, and the conduit or conduits connected to or forming part of the valve structure.

These objects and other advantageous ends I secure as hereinafter set forth, reference being had to the accompanying drawings, in which:—

Figure 1:
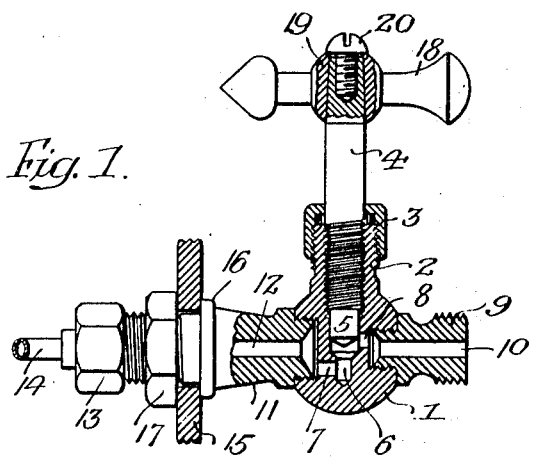
Figure 2:
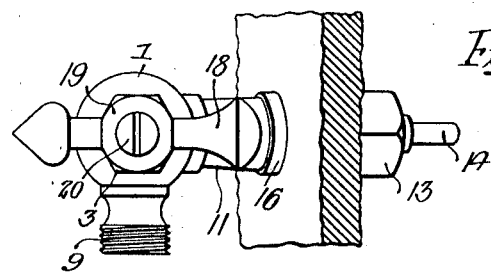
Figure 3:
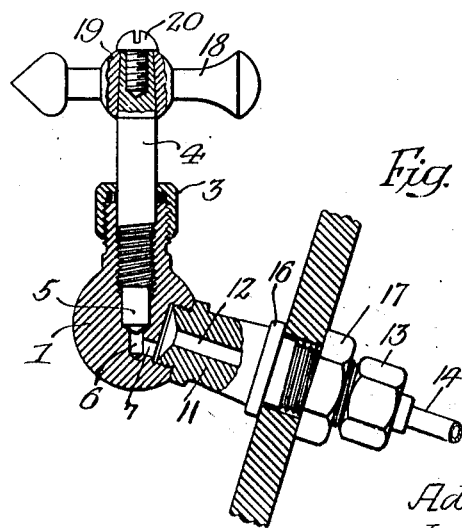

Figure 1, is a vertical section of a valve constructed according to my invention; and Figs. 2 and 3 are respectively a plan and a vertical section of a slightly modified form of my valve.

Referring to Fig. 1 of the above drawings, 1 represents the body of the valve which is of such design as to permit of its manufacture in a turret machine, and it consists of a solid mass of metal whose main portion is substantially spherical in form. This portion is provided with a projection 2 exteriorly threaded for the reception of a gland 3 and interiorly threaded for the reception of a valve stem 4. The end of this stem within the body 1, is made conical in shape, as indicated at 5, to form the valve proper, and said body 1 is made with a recess 6 of reduced diameter in line with the passage for the reception of the valve stem; the seat for the stem 5 being conical in form and connecting the walls of these two recesses or passages.

Leading from the small diameter passage 6 is a channel 7, while a second channel 8 leads from the valve stem passage immediately above the valve seat, so that in this particular case, the two passages 7 and 8 may be described as having their axes in the same plane; i. e. with reference to the line of the valve rod 4 they are 180 degrees distant from each other, the lines of their axes being substantially parallel.

The body 1 of the valve is provided with a relatively large recess forming a continuation of the passage 8 and threaded for the reception of a fitting 9 having a passage 10 designed to communicate with said passage 8. Similarly, the opposite face of the valve body 1 is recessed and threaded for the reception of a fitting 11 in which is a passage 12 communicating with the channel 7. It is to be noted that the passages 7 and 8 are eccentric to the threaded recesses into which they open and that the inner ends of the fittings 9 and 11 are dished. This construction permits the use of a smaller body 1 and also of symmetrical concentric inlet and outlet fittings; requiring no drilling after assembling to clear the air passages. In this instance, the fitting 12 is provided with a threaded outer end for the reception of a gland nut 13, whereby a fluid-tight connection may be made with a conduit 14. The valve is held to a supporting structure 15 by means of a flange 16 on the fitting 11 and a nut 17, as shown in Figs. 1 and 3.

The handle of the valve may be described as an arrow-shaped piece 18 provided with an enlarged boss 19 having a tapered hole for the reception of the similarly tapered outer end of the valve rod, which is threaded for the reception of a screw 20 confining said handle in place. The latter is so placed on the stem that when in the position shown there is free communication between the channels 7 and 8, and the threads of that part of the stem operative in the projection 2 of the valve body are of such design that when the valve is closed, the handle extends transversely of the general line of the fittings 9 and 11, in such a construction as that of Fig. 1.

With this construction of parts, it is possible with but a slight alteration in the position of either one or both of the cavities communicating with the channels 8 and 7, to make valves of a number of different designs whose inlet and outlet fittings extend in any of a corresponding number of lines relatively to each other. For example, in Figs. 2 and 3, I have illustrated a form of valve in which the fitting 9 projects from the side of the main valve structure 1, ninety degrees from the line of the fitting 11 and this latter extends in a line making more than an angle of 90 degrees with the line of the valve stem 4. It is possible to make any of a number of different styles of valves by merely changing the chucking of the valve bodies in the turret machine in which they are bored and tapped, so that the finished valve structure, in addition to being relatively simple and conveniently made, in a number of styles, is comparatively inexpensive in construction and may be made highly ornamental.

I claim:

1. The combination in a valve, of a body having a projection and provided with an elongated cavity; said cavity having two parts of different diameters connected by a valve seat, and also having a threaded portion; the body having recesses threaded to receive fittings and being provided with two passages respectively entering the recesses eccentrically of their center lines but parallel thereto, said passages entering the elongated cavity on opposite sides of the valve seat; a stem threaded to fit the threads of the cavity and having a valve portion coöperating with the seat of the body; and fittings having dished ends threaded into said recesses of the body.

2. The combination in a valve, of a body having a projection and provided with an elongated cavity; said cavity having two parts of different diameters connected by a valve seat, and also having a threaded portion; the body having two passages respectively entering the two parts of the cavity on opposite sides of the valve seat, and being provided with recesses eccentrically formed relatively to said passages but substantially parallel with the same; with a stem having a valve portion threaded into the cavity in position to coöperate with the seat thereof.

In testimony whereof, I have signed my name to this specification, in the presence of two subscribing witnesses.

ADOLPH W. SCHRAMM.

Witnesses:
WILLIAM E. BRADLEY,
JOS. H. KLEIN.